United States Patent
Heldman et al.

(10) Patent No.: US 10,893,033 B2
(45) Date of Patent: Jan. 12, 2021

(54) ACCESSING CLIENT CREDENTIAL SETS USING A KEY

(71) Applicant: salesforce.com, inc., San Francisco, CA (US)

(72) Inventors: Kyle Edward Heldman, Greenwood, IN (US); Douglas Christopher Wilson, Indianapolis, IN (US); Jackson Gregory Reed, Indianapolis, IN (US); Kyle Warren Apple, Fishers, IN (US); Jacob Andrew Richwine, Richmond, IN (US)

(73) Assignee: salesforce.com, inc., San Francisco, CA (US)

( * ) Notice: Subject to any disclaimer, the term of this patent is extended or adjusted under 35 U.S.C. 154(b) by 342 days.

(21) Appl. No.: 16/022,241

(22) Filed: Jun. 28, 2018

(65) Prior Publication Data
US 2020/0007520 A1    Jan. 2, 2020

(51) Int. Cl.
*H04L 29/06*    (2006.01)
*G06F 8/61*    (2018.01)
(Continued)

(52) U.S. Cl.
CPC .............. *H04L 63/062* (2013.01); *G06F 8/61* (2013.01); *G06F 9/547* (2013.01); *G06F 21/41* (2013.01);
(Continued)

(58) Field of Classification Search
CPC ............ G06Q 10/06; G06Q 10/06316; H04W 12/0804; G06F 21/41; H04L 63/0815; H04L 65/1063
See application file for complete search history.

(56) References Cited

U.S. PATENT DOCUMENTS

| 2004/0003081 A1 | 1/2004 | Justus et al. |
| 2010/0050183 A1* | 2/2010 | Ogura ............... G06F 21/41 |
| | | 718/106 |

(Continued)

OTHER PUBLICATIONS

Lomotey et al., "Saas Authentication Middleware for Mobile Consumers of IaaS Cloud", pp. 448-455 (Year: 2013).*

(Continued)

*Primary Examiner* — Thaddeus J Plecha
(74) *Attorney, Agent, or Firm* — Kowert, Hood, Munyon, Rankin & Goetzel, P.C.

(57) ABSTRACT

Techniques are disclosed relating to a computer system accessing a client credential set to authenticate with a destination computer system. A computer system may, subsequent to receiving an indication to make available an application for a particular user, retrieve configuration data specifying a reference to a key value. The computer system may maintain a data object that includes a client credential set for the particular user. In response to an occurrence of an event associated with the application, the computer system may access the client credential set of the particular user from the data object using the key value and an indication of the particular user. The computer system may then send a request including the client credential set to a destination computer system for authentication with the destination computer system and receive a response indicating whether the computer system has been authenticated.

20 Claims, 10 Drawing Sheets

(51) Int. Cl.
*G06F 9/54* (2006.01)
*G06F 21/41* (2013.01)
*G06Q 10/06* (2012.01)
*H04W 12/08* (2009.01)

(52) U.S. Cl.
CPC ....... *G06Q 10/06* (2013.01); *G06Q 10/06316* (2013.01); *H04L 63/0815* (2013.01); *H04L 63/0876* (2013.01); *H04L 65/1063* (2013.01); *H04W 12/0804* (2019.01)

(56) References Cited

U.S. PATENT DOCUMENTS

| | | | |
|---|---|---|---|
| 2011/0247066 A1 | 10/2011 | Lee | |
| 2011/0321131 A1* | 12/2011 | Austel | G06F 21/6236 726/4 |
| 2012/0158453 A1* | 6/2012 | Chung | G06Q 10/06316 705/7.26 |
| 2013/0086670 A1 | 4/2013 | Vangpat et al. | |
| 2014/0033279 A1 | 1/2014 | Nimashakavi et al. | |
| 2016/0028737 A1 | 1/2016 | Srinivasan et al. | |
| 2016/0065555 A1 | 3/2016 | Branden et al. | |
| 2016/0094403 A1 | 3/2016 | Somogyi et al. | |
| 2017/0235936 A1* | 8/2017 | de los Rios | G06F 21/36 726/19 |
| 2018/0083937 A1* | 3/2018 | Jahner | H04W 12/00 |
| 2018/0213048 A1* | 7/2018 | Messner | H04L 51/24 |
| 2019/0132321 A1* | 5/2019 | Pitchaimani | H04L 63/0815 |

OTHER PUBLICATIONS

OAuth 2.0 Integration for Real-Time Outbound Transfers; 2018 Adobe Systems Incorporated; https://marketing.adobe.com/resources/help/en_US/aam/oauth-in-outbound-transfers.html, 3 pages. [Retrieved Jun. 28, 2018].

International Search Report and Written Opinion in Appl. No. PCT/US2019/039822 dated Sep. 5, 2019, 14 pages.

* cited by examiner

ACCESSING CLIENT CREDENTIAL SETS USING A KEY

BACKGROUND

Technical Field

This disclosure relates generally to computer systems and, more specifically, to the accessing of client credential sets to authenticate with destination computer systems.

Description of the Related Art

Computer systems such as cloud-based platforms often run applications that interact with data stored by those systems for their users. Users who are not the provider of these computer systems may develop applications that are downloaded and installed to run on the computer systems. These applications may be designed to retrieve a user's data from databases that are accessible to the computer systems and then to perform operations on the data. In some cases, however, users may wish to handle their data in a particular manner that is not supported by the applications that are running on these computer systems.

Figure 1:
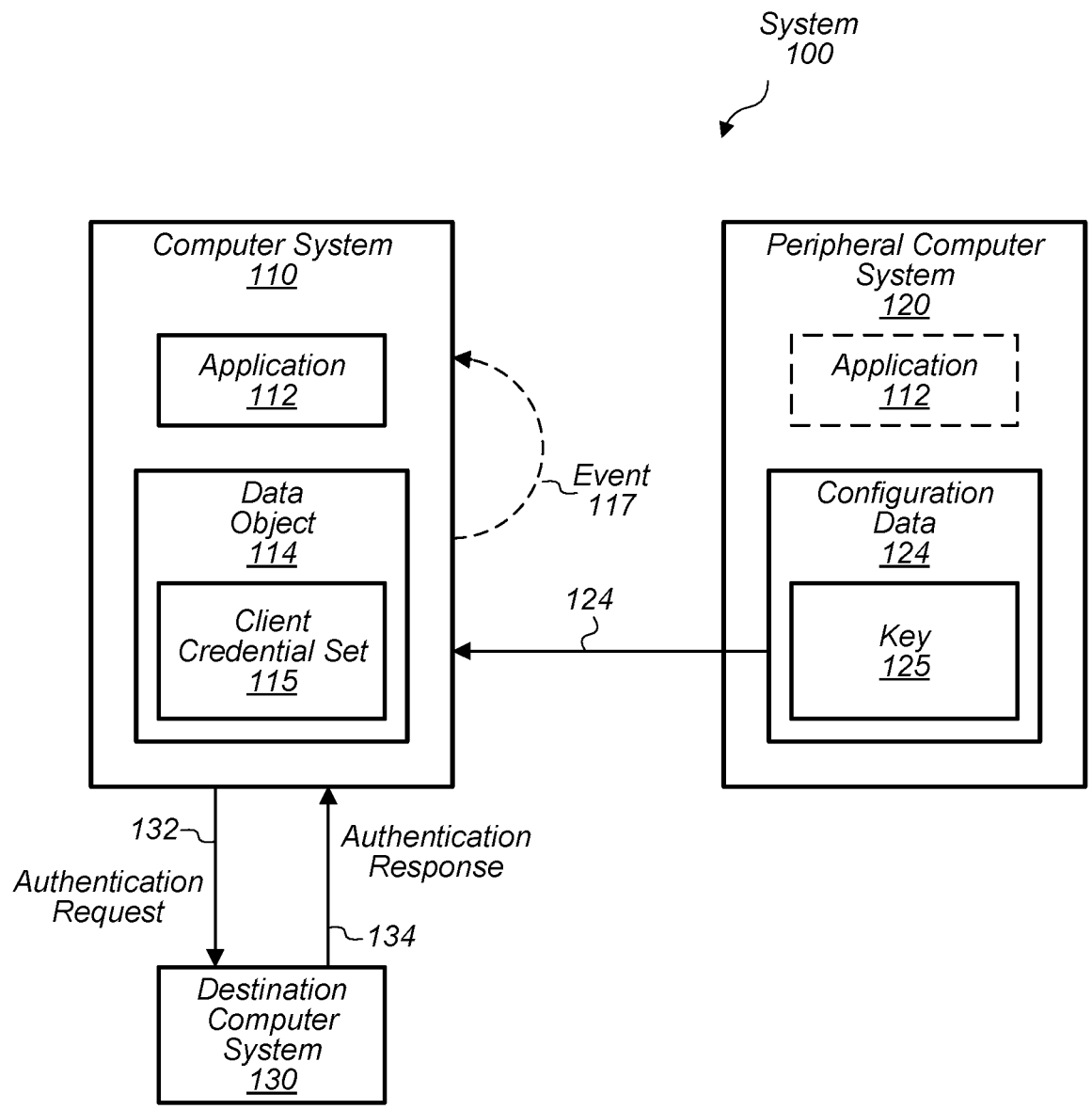
FIG. 1 is a block diagram illustrating example elements of a system for accessing client credential sets, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a one-time password that has multiple portions, the terms "first" portion and "second" portion can be used to refer to any portion of the one-time password. In other words, the first and second portions are not limited to the initial two portions of a one-time password.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Because the applications running on a particular computer system may not be able to perform particular tasks, it may be desirable to push data to (or request that tasks be performed by) another computer system that is remotely located and which may be referred to as a "destination computer system." In order to push the data to a destination computer system, an application may first have to authenticate (on behalf of a given user) with the destination computer system by providing client credentials belonging to the user. In some cases, a computer system may authenticate with the destination computer system on behalf of the application using client credentials specified by the application. Such applications, however, may not be designed to support multiple, unique client credentials across different users or to cause a computer system to issue requests to different destination computer systems depending on the user using the application. Thus, it may be desirable to enable an application to be installed by different users of a computer system and to be able to facilitate access to multiple client credentials depending on the user.

The present disclosure describes various techniques for enabling access to one or more client credential sets usable to authenticate with a respective destination computer system. In various embodiments described below, a computer system uses a key that it receives in association with a particular application to lookup client credential sets stored for different user accounts. In particular, in various embodiments, a computer system provides a server-based platform, which is accessible to multiple users, that allows for an application developed by one user to be installed and used by other users. Accordingly, in some embodiments, a user may install a particular application (at the computer system) that is capable of causing requests to be sent to a destination computer system—in some cases, using functionality that is provided by the computer system. When a user wishes to setup the application, in various embodiments, the computer system retrieves configuration data from a different computer system. This configuration data may specify a key for accessing one or more client credential sets stored for different user accounts. In various cases, the user may independently provide a mapping from the key to their client credential set. Accordingly, in various embodiments, when an event occurs with the application, the computer system then accesses the client credential set for the user by using the key and the mapping provided by the user. Thereafter, in various embodiments, the computer system sends a request to authenticate with a destination computer system, where the request includes the client credential set. In various cases, another user may install the application and provide a mapping from the key to their own client credential set. Accordingly, when an event occurs with that application, the computer system may access that user's client credential set within that user's account using the key. Thus, the key may enable access to one or more client credential sets.

In some embodiments, the particular application might be implemented as part of a larger framework. For example, in one context, the particular application might be something that is selectable within a tool that allows the development of a workflow process. (Such a tool might allow a user to develop a computer-implemented method, one step of which might be execution of the particular application.) Accordingly, a user may install an application under their account with the computer system. The user may then add a step to a workflow process, where the step corresponds to the application. In such an environment, when the step in the workflow process is reached, in various embodiments, the computer system then executes the installed application to perform desired operations such as sending a notification to a destination system.

As one of many possible examples that illustrate aspects of such an approach, consider a communication application that sends messages to a third-party system that requires authentication. For example, different instances of an application might be installable by different users to send messages (referred to as tweets) to TWITTER. In order to send these communications, the communication application may first have to authenticate with the third-party system before it can send the messages. In prior approaches, in order to authenticate, the communication application might need to be embedded with authentication credentials during the creation of the application. In other words, in this type of implementation, in order for the communication application to be installed and used by multiple users (which is a requirement for many applications), a different instance of the application would have to be built for each user, with each instance containing credentials for the corresponding user. But using the techniques described herein allows a developer to create, for example, a single communication application that can access the appropriate credentials for each of many users who install and use the application. In some implementations, the communication application may use a key value to lookup a client credential set for the account under which the communication application is installed.

These techniques may be advantageous over prior approaches as these techniques allow for the creation of a single, multi-tenant application that facilitates authenticated requests to a destination computer system (in some cases, multiple systems) on behalf of one or more users. That is, the key (explained above) may enable an application 1) to be installed in different user accounts and 2) to access the client credential set for a respective user account when making authenticated requests to a destination computer system on behalf of the user of that account. A system for implementing these techniques will now be discussed below, starting with FIG. 1.

Turning now to FIG. 1, a block diagram of a system 100 is shown. System 100 is a set of components that are implemented via hardware or a combination of hardware and software routines. In the illustrated embodiment, system 100 includes computer system 110, peripheral computer system 120, and destination computer system 130. As further shown, computer system 110 includes an application 112 and a data object 114 having a client credential set 115. Also as shown, peripheral computer system 120 includes configuration data 124 that has a key 125. In some instances, application 112 may be maintained by peripheral computer system 120. In some embodiments, system 100 is implemented differently than shown—e.g., systems 120 and 130 may be part of the same component (i.e. combined).

Computer system 110, in various embodiments, implements a server-based platform that allows users of that service to develop, run, and manage applications, including those associated with workflow processes such as application 112. Computer system 110 may be, for example, a multi-tenant database system such as the multi-tenant database system discussed in detail below with respect to FIGS. 8 and 9. Accordingly, computer system 110 may interact with users, applications, databases, and other systems (e.g., systems 120 and 130) in order to store, analyze, operate on, and serve data.

In various embodiments, computer system 110 provides a service through the server-based platform that allows a tenant (i.e., a designated group of users, such as those belonging to a company or a group within a company) of that service to create a workflow process that has various steps designed to control the flow of the process and to cause interactions to occur with users (e.g., customers) that are associated with the tenant. One possible example of such a workflow service is SALESFORCE's JOURNEY BUILDER, which allows for the users of SALESFORCE's platform to track a series of interactions with customers, potentially across different channels such as mobile devices and the Web.

The steps in a workflow process may include, for example, deciding which path to take in the workflow process, sending a text or email to a user, updating a database record of a user, etc. In various embodiments, the steps in a workflow process are implemented by underlying applications (e.g., application 112). Returning to the communication application example, a user that installs the application might add a step to a corresponding workflow process (e.g., an indication of the step such as an icon) that causes one or more e-mails to be sent to the user (or some other entity). When that step is reached, computer system 110 may execute or cause execution of the communication application to send a notification to the user. (Note that while the interactions involving application 112 are described in the context of a workflow process, other contexts are considered—e.g., computer system 110 may simply execute application 112 in response to a request from a user to run the application.)

In some instances, when a step is reached in a workflow process, it may be desirable to communicate with a destination computer system 130 (e.g., an endpoint system such as a user's own server system or a third-party system such as TWITTER that provides a service of interest). Accordingly, in various embodiments, application 112 may cause application programming interface (API) calls to be made to destination computer system 130. In some cases, application 112 may make these calls directly to the destination computer system 130 while, in other cases, application 112 may be designed to utilize the functionality of computer system 110 to make such API calls—e.g., application 112 may issue a request to another program running on computer system 110 to make the API calls. In either case, it can be said that computer system 110 makes the API calls to destination computer system 130. In order to make these API calls to destination computer system 130, computer system 110 may first have to authenticate with destination computer system 130. In various embodiments, computer system 110 uses a client credential set 115 maintained in data object 114 to authenticate with destination computer system 130. In particular, computer system 110 may pass in a client credential set 115 to an authentication service provided by destination computer system 130 in order to receive an authentication token, which may allow for authenticated API calls. In various embodiments, a client credential set 115 is provided by the user who installs application 112 under their account at computer system 110.

Application 112 may be developed and installed by users (i.e., tenants) of computer system 110 and then used by those users (or other users) in their own workflow processes. While application 112 is depicted as residing at computer system 110, in various embodiments, application 112 resides at a different system such as peripheral computer system 120. In such embodiments, when application 112 needs to be executed, computer system 110 may cause execution of application 112 by instructing peripheral computer system 120 to execute it. If application 112 is executed at peripheral computer system 120 to make API calls directly to destination computer system 130, then peripheral computer system 120 can be said to make such calls. In some embodiments, application 112 may be divided into at least two components: program instructions that are executed by computer system 110 and program instructions that are executed by peripheral computer system 120. As an example, computer system 110 may execute program instructions to present a user interface to a user for configuring a step in a workflow process whereas peripheral computer system 120 may execute program instructions to carry out the functionality of that step.

When installing application 112, in some embodiments, computer system 110 may retrieve (e.g., download) application 112 from peripheral computer system 120. That is, application 112 may be a third-party application developed and provided by peripheral computer system 120 for downloading by other entities. For example, computer system 110 may download the communication application from a server system of the company that created the application. In some embodiments, application 112 is maintained at computer system 110 as part of an application store, which may be provided by computer system 110. Once installed, in various embodiments, application 112 is made available to the user (who installed it) for inclusion into their workflow process. Thus, a user may add an indication (e.g., a step) to their workflow process that corresponds to the installed application 112.

After installing application 112 (or, in some cases, before), in various embodiments, a user may provide a mapping between key 125 and a client credential set 115—this mapping may be stored in or as data object 114. In various cases, that user may obtain key 125 from the provider of application 112 (e.g., the developer) and may obtain a client credential set 115 from a provider of destination computer system 130. In various embodiments, key 125 is also separately included in configuration data 124, which may be provided to computer system 110 by peripheral computer system 120. In particular, when a user adds a step (corresponding to an application 112) to their workflow process, computer system 110 may retrieve configuration data 124 from peripheral computer system 120 for configuring that application 112.

When that step is reached within the workflow process, in various embodiments, computer system 110 looks up a client credential set 115 in data object 114 using key 125. In particular, client credential set 115 may be stored in association with a particular account at computer system 110 and thus system 110 may look up the client credential set 115 stored for that account using key 125. Thereafter, in various embodiments, computer system 110 issues an authentication request 132 to authenticate with destination computer system 130. Request 132 may include the retrieved client credential set 115. Computer system 110 may then receive an authentication response 134 indicative of whether computer system 110 has been authenticated.

Peripheral computer system 120, in various embodiments, provides a particular application 112 (and corresponding configuration data 124) that can be installed by users of computer system 110 and then used by those users in their workflow processes. Peripheral computer system 120 may be, for example, a computer system maintained by a third-party provider who develops applications 112 for installation/registration at computer system 110. In some embodiments, peripheral computer system 120 separately provides application 112 and configuration data 124 to computer system 110. In particular, peripheral computer system 120 may upload a particular application 112 to an application store service provided by computer system 110. Accordingly, users of computer system 110 may download and install the particular application 112 by accessing the application store service. Once a user has added a step that corresponds to an installed application 112 to their workflow process, that user may configure that application 112. Accordingly, computer system 110 may retrieve configuration data 124 from peripheral computer system 120.

In various embodiments, peripheral computer system 120 provides configuration data 124 via a web page. In particular, in some embodiments, peripheral computer system 120 hosts a web application that is associated with application 112. Accordingly, when computer system 110 wishes to retrieve configuration data 124, computer system 110 may send a set of Hypertext Transfer Protocol (HTTP) requests to peripheral computer system 120 and receive a web page that includes configuration data 124 in response. In some embodiments, computer system 110 presents the web page to the user through an iframe. The user may then provide additional information (into forms and other elements of the web page) that can be used when processing application 112. In some embodiments, a user may provide the mapping between key 125 and a client credential set 115 via the presented web page.

Destination computer system 130, in various embodiments, is an end-point computer system that provides desired functionality. In particular, it may be desirable to access particular data and/or functions that are not supported by a particular application 112. For example, a user may wish to push data from computer system 110 to destination computer system 130 for post data processing. In some embodiments, the functionality of destination computer system 130 is accessible via a protected API. As such, in various embodiments, computer system 110 may first have to authenticate with destination computer system 130 before using the protected API to access some desired functionality. Accordingly, computer system 110 may provide a client credential set 115 to destination computer system 130 in order to authenticate with destination computer system 130 on behalf of the particular user corresponding to that client credential set. After being authenticated, computer system 110 may then make API calls for sending data to destination computer system 130 or accessing particular functionality that is provided by system 130. In some embodiments, computer system 110 receives responses to the API calls. The response may, for example, indicate a success (or failure) or may include requested data.

In one example implementation of system 100, a computer system 110 provides a server-based platform (e.g., a multi-tenant database system) accessible to a plurality of users. In this example, the server-based platform allows an application 112 such as the communication application to be installed by users of computer system 110. The communication application may be provided by a third-party provider and used in a workflow process. Accordingly, in this example, the user who has installed this communication application may add a step into their workflow process that corresponds to the application. After the user has added the step, in this example, computer system 110 retrieves configuration data 124 from the third-party provider's system (peripheral computer system 120). This configuration data 124 may specify a key 125. Separately, the user may provide a mapping between that key 125 and a client credential set 115 usable for authenticating with a destination computer system 130. The user may obtain that key 125 from the third-party provider. When the step in the workflow process is triggered, in this example, computer system 110 uses the particular key 125 to access the client credential set 115 provided by the user. Once the client credential set 115 has been accessed, computer system 110 may authenticate with the destination computer system 130 and then provide it with a notification.

Continuing with the example implementation, computer system 110 may receive a request from another user to install the communication application so that this other user can add a step to their workflow process. Accordingly, this other user may provide a mapping between key 125 and their client credential set 115. This mapping may be specified in a data object 114 that is maintained under this other user's account. Thus, when the step is triggered in this other user's workflow, computer system 110 uses the same key 125, but looks under this other user's account (instead of the original user's account) for a client credential set 115. Once the client credential set 115 has been accessed for this other user, computer system 110 may authenticate with the same (or another) destination computer system 130 and then provide it with a notification.

Implementing system 100 in this manner may be advantageous as it may allow for an application to be developed that can facilitate access to the client credential sets of the different users who install the application. An example high-level view of the mapping between key 125 and client credential sets 115 will now be discussed with respect to FIG. 2.

Figure 2:
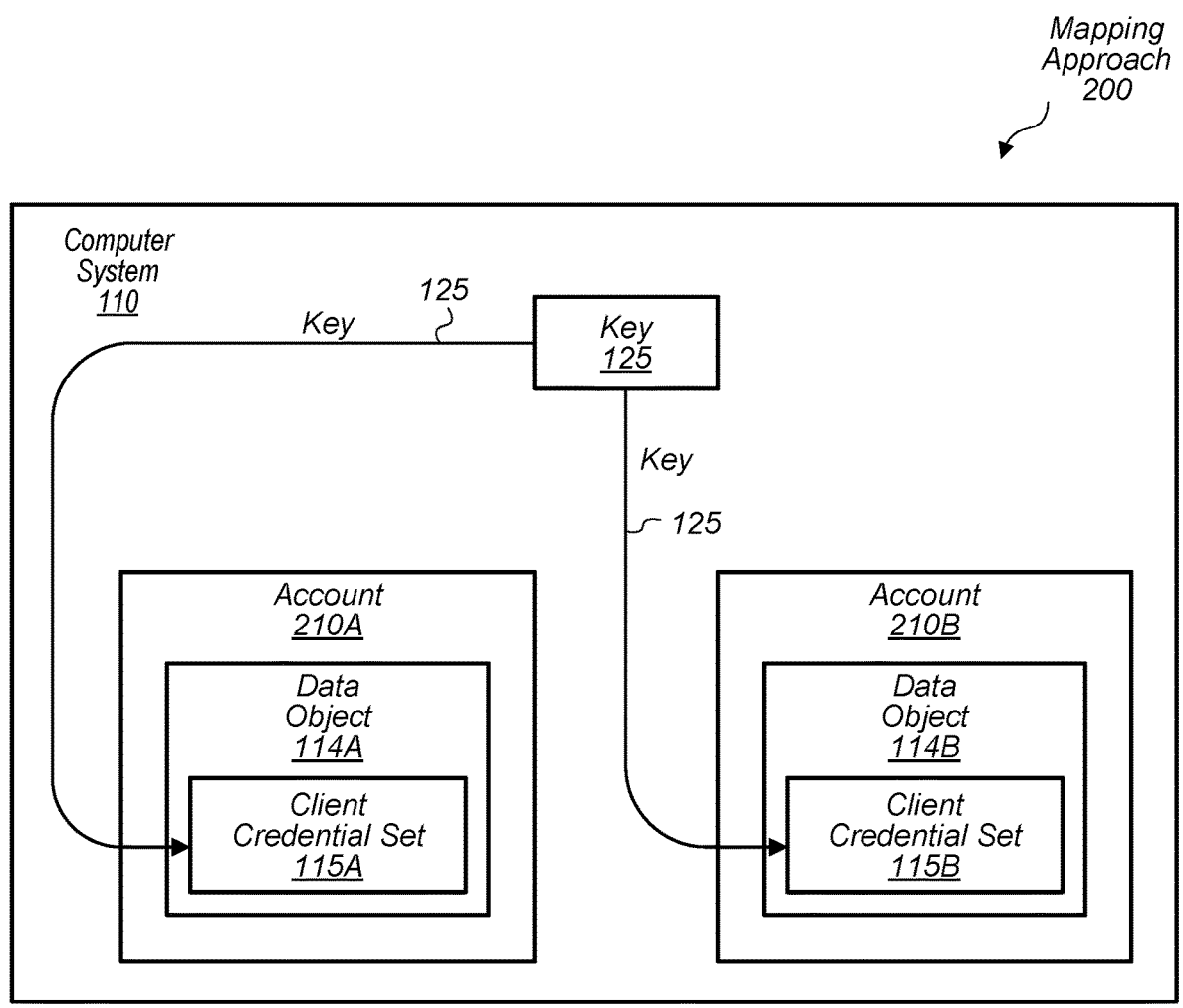
FIG. 2 is a block diagram illustrating example approach for mapping a key to a plurality of client credential sets, according to some embodiments.

Turning now to FIG. 2, a block diagram of an example approach for mapping a key 125 to different client credential sets 115 is shown. In the illustrated embodiment, approach 200 involves a computer system 110 having accounts 210A and 210B. As further shown, account 210A includes a data object 114A having a client credential set 115A, and account 210B includes a data object 114B having a client credential set 115B. While multiple accounts 210 are shown as residing at computer system 110, in some embodiments, one or more accounts 210 may be maintained at another location.

As mentioned earlier, computer system 110 may be a multi-tenant database system capable of providing a server-based platform to multiple users. Accordingly, in various embodiments, computer system 110 maintains accounts 210 for its users that allows them to access functions that are provided by computer system 110, including the storing of data in association with an account 210. In some embodiments, computer system 110 may store, for a given account 210, a data object 114 defining a mapping from key 125 to client credential set 115 (and, in some cases, additional information such as the location (e.g., a URL) of destination computer system 130).

Key 125, in various embodiments, is an identifier usable for looking up client credential sets 115 in data objects 114 of accounts 210. In some embodiments, key 125 is a value that is globally unique and is defined by a developer of the associated application 112. Key 125 may be, for example, a String value of random characters (e.g., numbers, letters, etc.). In various embodiments, key 125 is provided to computer system 110 at two different points: 1) when a user provides the mapping of key 125 to a client credential set 115 and 2) when computer system 110 retrieves configuration data 124. In some instances, computer system 110 may receive key 125 only when it receives configuration data 124. In such instances, computer system 110 may then request that a user provide a client credential set 115 to which computer system 110 will map key 125. Key 125 may be usable to access multiple client credential sets 115. In particular, as a data object 114 is stored in association with an account 210, the combination of key 125 and account 210 may allow computer system 110 to access the particular client credential set 115 associated with a particular user.

Client credential set 115, in various embodiments, is a set of values that enable systems such as computer system 110 to be authenticated with a destination computer system 130 (on behalf of a user of those credentials). A client credential set 115 may be, for example, a client identifier and a client secret (such as what is used in OAUTH), or may be a username and password. In various embodiments, a client credential set 115 is provided by a user of application 112. For example, a user may provide a client credential set 115 when providing a mapping between key 125 and that client credential set 115.

In various embodiments, valid service uniform resource locators (URLs) may be stored with client credential set 115 and accessed using key 125. Valid service URLs may identify a set of locations where a token (received via authentication response 134) may be used to access resources. For example, if a valid service URL pattern of www.twitter.com/* is specified, a token received in a token response payload may then be sent to all TWITTER endpoints (e.g., www.twitter.com/api), but not to other endpoints (e.g., www.fakeendpoint.com/api).

As intended to be shown in FIG. 2, key 125 may be used to access the client credential set 115 stored within accounts 210. Accordingly, when computer system 110 attempts to lookup a client credential set 115, computer system 110 may access the data object 114 stored in the relevant account 210—that relevant account may be associated with a workflow process that includes a step corresponding to an application 112. That is, in various embodiments, when a step that corresponds to an application 112 is reached in a workflow process, computer system 110 may then access the client credential set 115 (using key 125) that is stored the particular account 210 that is associated with that workflow process. Thus, application 112 may be installed by multiple users and used in multiple workflow processes while still being able to facilitate access to the particular client credential set 115 relevant to each workflow process and user. An example of computer system 110 will now be discussed with respect to FIG. 3.

Figure 3:
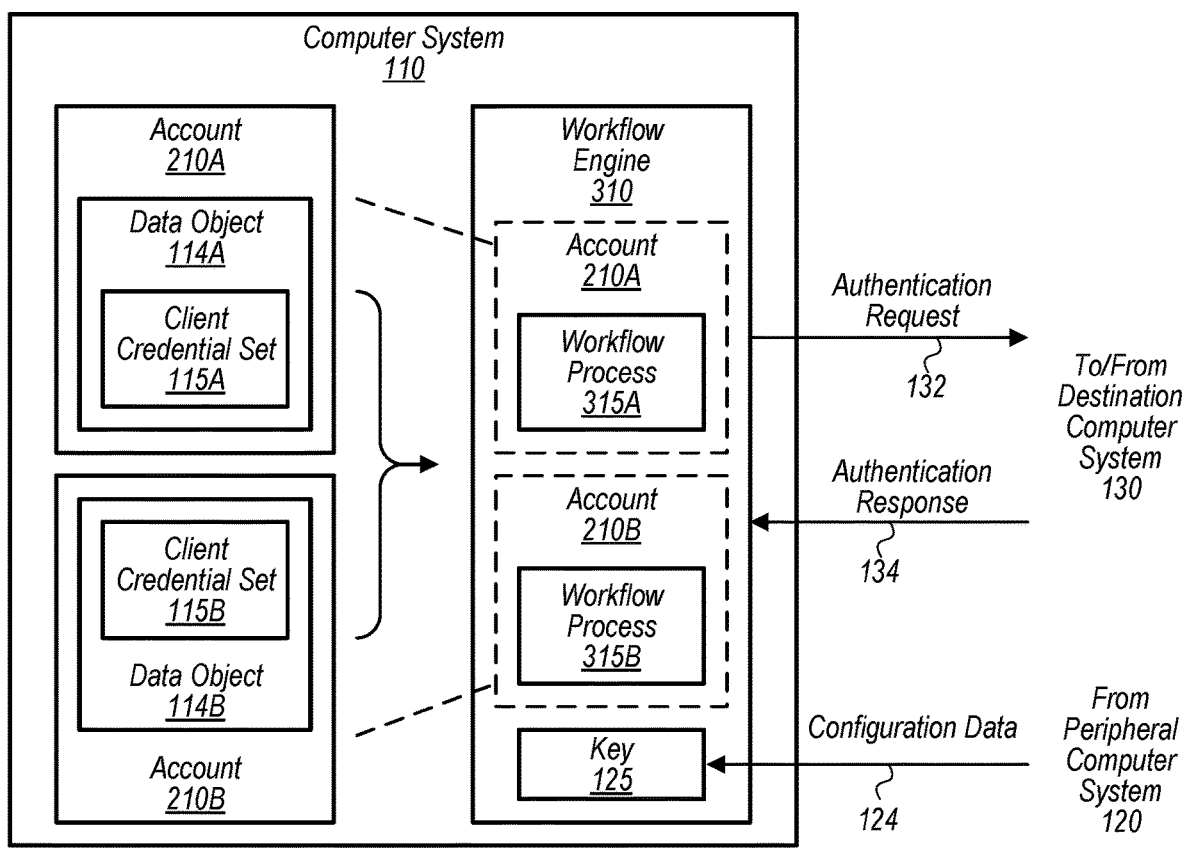
FIG. 3 is a block diagram illustrating example elements of a computer system that accesses client credential sets using a key, according to some embodiments.

Turning now to FIG. 3, a block diagram of computer system 110 is shown. In the illustrated embodiment, computer system 110 includes accounts 210 and a workflow engine 310. As shown, workflow engine 310 includes two workflow processes 315 and a key 125. As further shown, each account 210 includes a corresponding data object 114 having a client credential set 115. In some embodiments, computer system 110 is implemented differently than shown. For example, computer system 110 may not include a workflow engine 310, but instead may execute applications 112 and use key 125 absent a workflow process—i.e., in a context different than a workflow process.

Workflow engine 310, in various embodiments, enables the management of workflow processes 315, including the creation and execution of those processes. Accordingly, a user may create a workflow process 315 by adding various steps that are indicative of actions to be performed during the execution of that process. While workflow engine 310 may provide (or support) a default set of steps (e.g., steps that are supplied by the provider of computer system 110), in various embodiments, engine 310 allows a user to add custom steps designed by that user or another entity. To add a custom step, a user may register/install an application 112 as was noted earlier. In some cases, as part of the installation of a particular application 112, a user may provide an indication (e.g., an endpoint URL) of where that particular application 112 is maintained—e.g., a URL of peripheral computer system 120. Accordingly, computer system 110 may retrieve that particular application 112 and make it available to use in workflow processes 315 that are associated with the user who requested it. Once the particular application 112 is available to use in a workflow process 315, the user may add a step corresponding to that application to their workflow process. In some embodiments, such steps are added to a workflow process 315 by dragging and dropping steps onto a canvas that is displayed within a graphical user interface provided by computer system 110.

In some embodiments, a workflow process 315 is associated with event-driven triggers that control the movement through the various steps. For example, a user purchasing a product may initiate a workflow process 315 where the first step is to send an email about the purchase to the email of the user. Accordingly, the occurrence of a step corresponding to an application 112 may be triggered in response to an event 117. As an example, in response to a month passing since the previous step was performed, workflow engine 310 may initiate the next step which might be a step corresponding to an application 112. In response to such a step being triggered, computer system 110, in various embodiments, executes or causes execution of (e.g., instructs peripheral computer system 120 to execute) the corresponding application 112.

The execution of application 112, in various embodiments, causes computer system 110 to retrieve a particular client credential set 115 using key 125. As mentioned earlier, a workflow process 315 may be associated with an account 210. As shown, for example, workflow process 315A is associated with account 210A and workflow process 315B is associated with account 210B. Thus, the execution of application 112 in association with workflow process 315A may cause computer system 110 to access client credential set 115A as it is stored for account 210A. In addition to accessing a client credential set 115, in some embodiments, computer system 110 further accesses information (e.g., a URL), stored for the appropriate account 210, that identifies a destination computer system 130. Such information may be stored in a data object 114. Thereafter, in various embodiments, computer system 110 issues a request 132 to authenticate with the destination computer system 130 and receives a response 134 indicating whether computer system 110 is authenticated with destination computer system 130. Response 134 may include an authentication token. Accordingly, computer system 110 may make further API calls (which include the received authentication token) to destination computer system 130 for performing certain operations. An example of destination computer system 130 will now be discussed with respect to FIG. 4.

Figure 4:
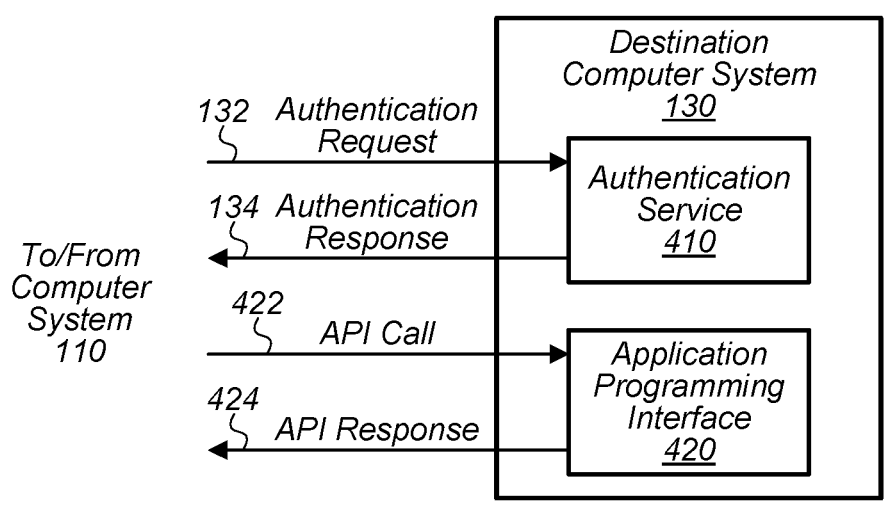
FIG. 4 is a block diagram illustrating example elements of a destination computer system that implements an authentication service, according to some embodiments.

Turning now to FIG. 4, a block diagram of a destination computer system 130 is shown. In the illustrated embodiment, destination computer system 130 includes an authentication service 410 and an API 420. In some embodiments, destination computer system 130 is implemented differently than shown—e.g., destination computer system 130 may be combined with peripheral computer system 120. As noted earlier, destination computer system 130 may authenticate computer system 110 and then allow for computer system 110 to make authenticated API calls.

Authentication service 410, in various embodiments, facilitates the authentication of a computer system such as computer system 110. In order to authenticate computer system 110, service 410 may verify the client credential set 115 supplied in request 132 by comparing it against a valid client credential set 115 stored by destination computer system 130. In various embodiments, if the client credential set 115 supplied in the request 132 is valid, then service 410 returns an authentication token in a response 134. The token may allow for computer system 110 to make authenticated API calls to destination computer system 130. If the client credential set 115 is not valid, then service 410 may return an indication that computer system 110 has not been authenticated.

Application programming interface 420, in various embodiments, allows computer system 110 to interact with the functionality provided by destination computer system 130. As an example, computer system may provide data to destination computer system 130 or issue commands via API 420. In order to utilize API 420, computer system 110 may have to an obtain authentication token through service 410. Once computer system 110 has an authentication token, computer system 110 may make API calls 422 through API

420. In some embodiments, destination computer system 130 provides an API response 424 to computer system 110. An API response 424 may include, for example, requested data or an indication that a particular operation has been performed.

Figure 5:
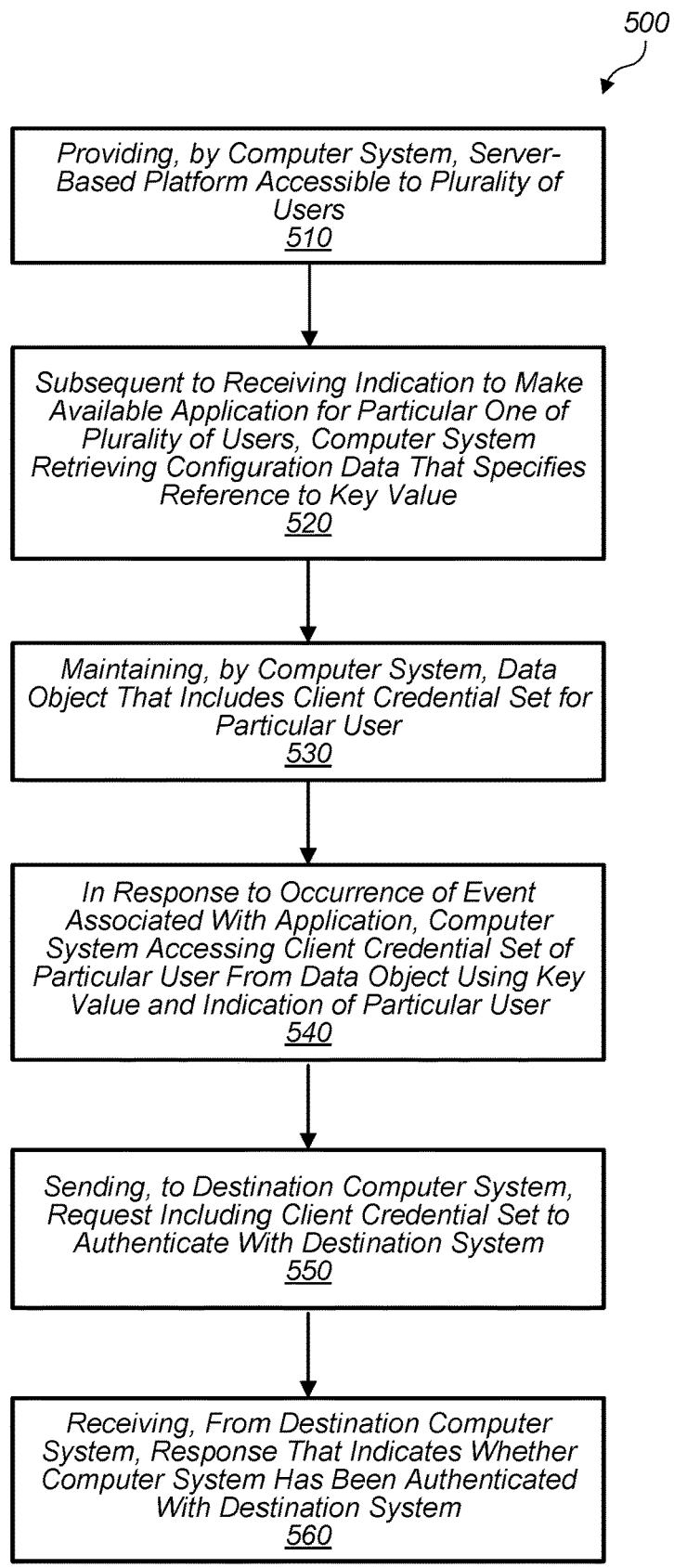
FIGS. 5-7 are flow diagrams illustrating example methods relating to the accessing of credentials using a key, according to some embodiments.

Turning now to FIG. 5, a flow diagram of a method 500 is shown. Method 500 is one embodiment of a method performed by a computer system such as computer system 110 to authenticate with a destination computer system (e.g., destination computer system 130). Method 500 may include additional steps such as the computer system providing a user access to a data store for installing an application (e.g., application 112).

Method 500 begins in step 510 with the computer system providing a server-based platform that is accessible to a plurality of users. This server-based platform may permit an application that is developed by one of the plurality of users to be utilized by others of the plurality of users.

In step 520, subsequent to receiving an indication to make available an application for a particular one of the plurality of users, the computer system retrieves configuration data (e.g., configuration data 124) from a different computer system (e.g., peripheral computer system 120). This configuration data may specify a reference to a key value (e.g., key 125). Making the application available, in some embodiments, includes installing or registering the application under an account (e.g., account 210) of the particular user and allowing the particular user to add a step corresponding to the application to a workflow process (e.g., process 315).

In step 530, the computer system maintains a data object (e.g., data objects 114) that includes a client credential set (e.g., client credential set 115) for the particular user.

In step 540, in response to an occurrence of an event (e.g., event 117) associated with the application, the computer system accesses the client credential set of the particular user from the data object using the key value and an indication of the particular user (e.g., an account identifier). In some embodiments, the indication of the particular user corresponds to an account under which the data object is maintained. Thus, accessing the client credential set may include accessing the data object for that account. The occurrence of the event may include reaching the step in the workflow process.

In step 550, the computer system sends, to a destination computer system, a request (e.g., request 132) to authenticate with the destination computer system. The request may include the client credential set. In various embodiments, prior to sending the request to authenticate with the destination computer system, the computer system receives, from the particular user, information defining a mapping from the key value to the client credential set. The data object may specify the mapping. In some embodiments, prior to sending the request to authenticate with the destination computer system, the computer system receives, from the particular user, information specifying a uniform resource locator (URL) that corresponds to the destination computer system. Accordingly, the request to authenticate may be sent based on the specified URL.

In step 560, the computer system receives, from the destination computer system, a response (e.g., response 134) that indicates whether the computer system has been authenticated with the destination computer system.

In some embodiments, the computer system receives an indication to make available the application for a different one of the plurality of users. The computer system may maintain a second data object (e.g., data object 114B) that includes a client credential set (e.g., set 115B) for the different user. In response to an occurrence of an event associated with the application and the different user (e.g., the event occurs in association with an application that is installed under the different user's account 210), in some embodiments, the computer system accesses the client credential set of the different user from the second data object using the key value and an indication of the different user. The computer system may then send to a different (or the same) destination computer system a request to authenticate with that destination computer system. The request may include the client credential set of the different user.

Figure 6:
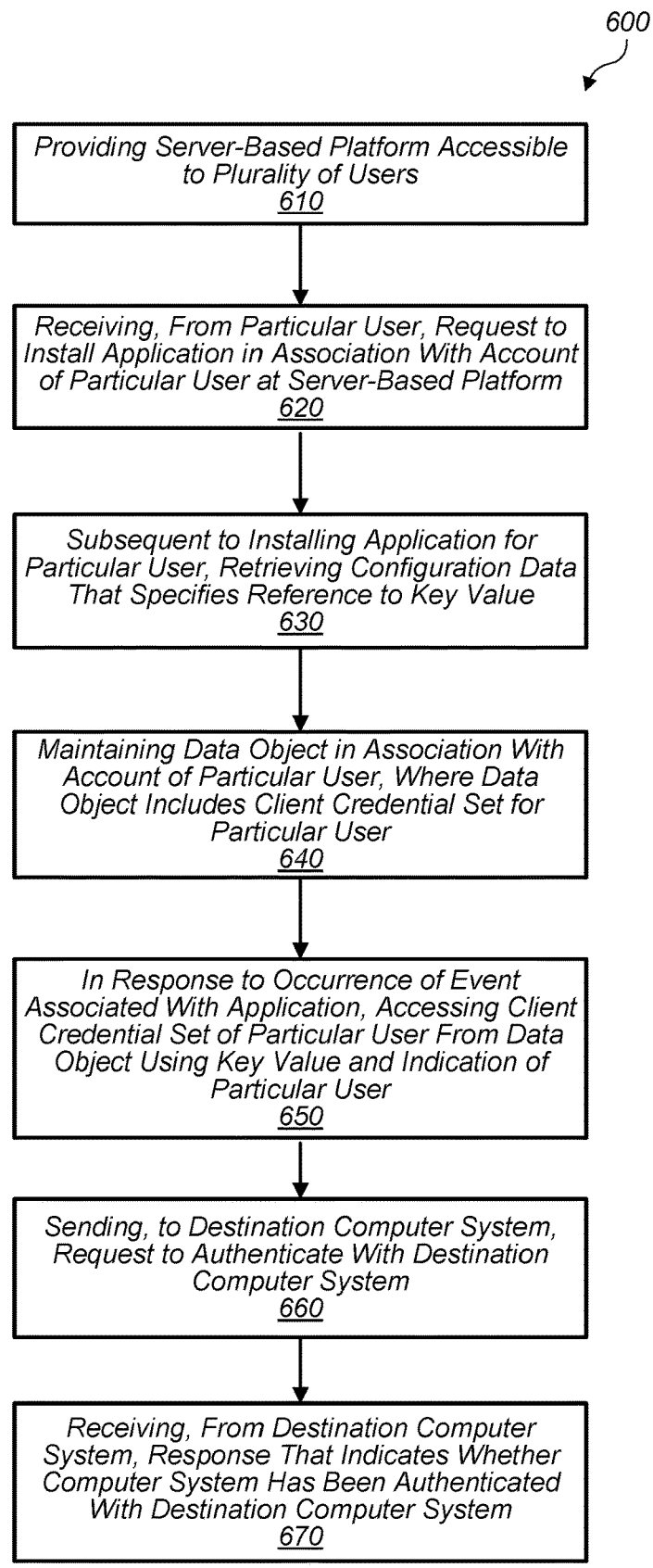

Turning now to FIG. 6, a flow diagram of a method 600 is shown. Method 600 is one embodiment of a method performed by a computer system such as computer system 110 for accessing client credential sets (e.g., client credential sets 115) to authenticate with a destination computer system (e.g., destination computer system 130). Method 500 may include additional steps such as the computer system providing a user access to a data store for installing an application (e.g., application 112).

Method 600 begins in step 610 with the computer system providing a server-based platform accessible to a plurality of users. The server-based platform may permit an application (e.g., application 112) that is developed by one of the plurality of users to be installed by others of the plurality of users.

In step 620, the computer system receives, from a particular user, a request to install the application in association with an account (e.g., an account 210) of the particular user at the server-based platform.

In step 630, subsequent to installing the application for the particular user, the computer system retrieves configuration data (e.g., configuration data 124) that specifies a reference to a key value (e.g., key 125). Subsequent to installing the application for the particular user, in various embodiments, the computer system receives a request from the particular user to modify a workflow process (e.g., workflow process 315) to add a step corresponding to the application. In response to receiving a request to configure the added step, the computer system may retrieve the configuration data.

In step 640, the computer system maintains a data object (e.g., a data object 114) in association with the account of the particular user. In various embodiments, the data object includes a client credential set (e.g., client credential set 115) for the particular user.

In step 650, in response to an occurrence of an event associated with the application, the computer system accesses the client credential set of the particular user from the data object. The client credential set of the particular user may be accessed using the key value and an indication of the particular user. The indication of the particular user may be an account identifier corresponding to the account under which the data object is maintained. In various embodiments, in response to the occurrence of the event associated with the application, the computer system executes the installed application to perform a set of operations that initiate steps 660 and 670.

In step 660, the computer system sends, to a destination computer system, a request (e.g., request 132) to authenticate with the destination computer system. In various embodiments, the request includes the client credential set. In various embodiments, the computer system receives, from the particular user, authentication information that specifies a uniform resource locator (URL), the client credential set, and a mapping between the key value and the client credential set. The URL may correspond to an authentication service (e.g., service 410) implemented at the destination computer system and the data object may correspond to the mapping.

In step 670, the computer system receives, from the destination computer system, a response (e.g., response 134) that indicates whether the computer system has been authenticated with the destination computer system. In various embodiments, the response from the destination computer system includes an authentication token. As such, the computer system may make authenticated application programming interface (API) calls to the destination computer system on behalf of the application. Such API calls may include the authentication token.

In various embodiments, the computer system receives, from a different user, a request to install the application in association with an account (e.g., account 210B) of the different user at the server-based platform. In some embodiments, the computer system maintain a second data object (e.g., data object 114B) in association with the account of the different user. This data object may include a client credential set for the different user. As such, in response to an occurrence of an event associated with the application, the computer system may access the client credential set of the different user from the second data object using the key value and an indication of the different user. In some embodiments, the computer system sends, to the destination computer system, a request to authenticate with the destination computer system. The request may include the client credential set of the different user.

Figure 7:
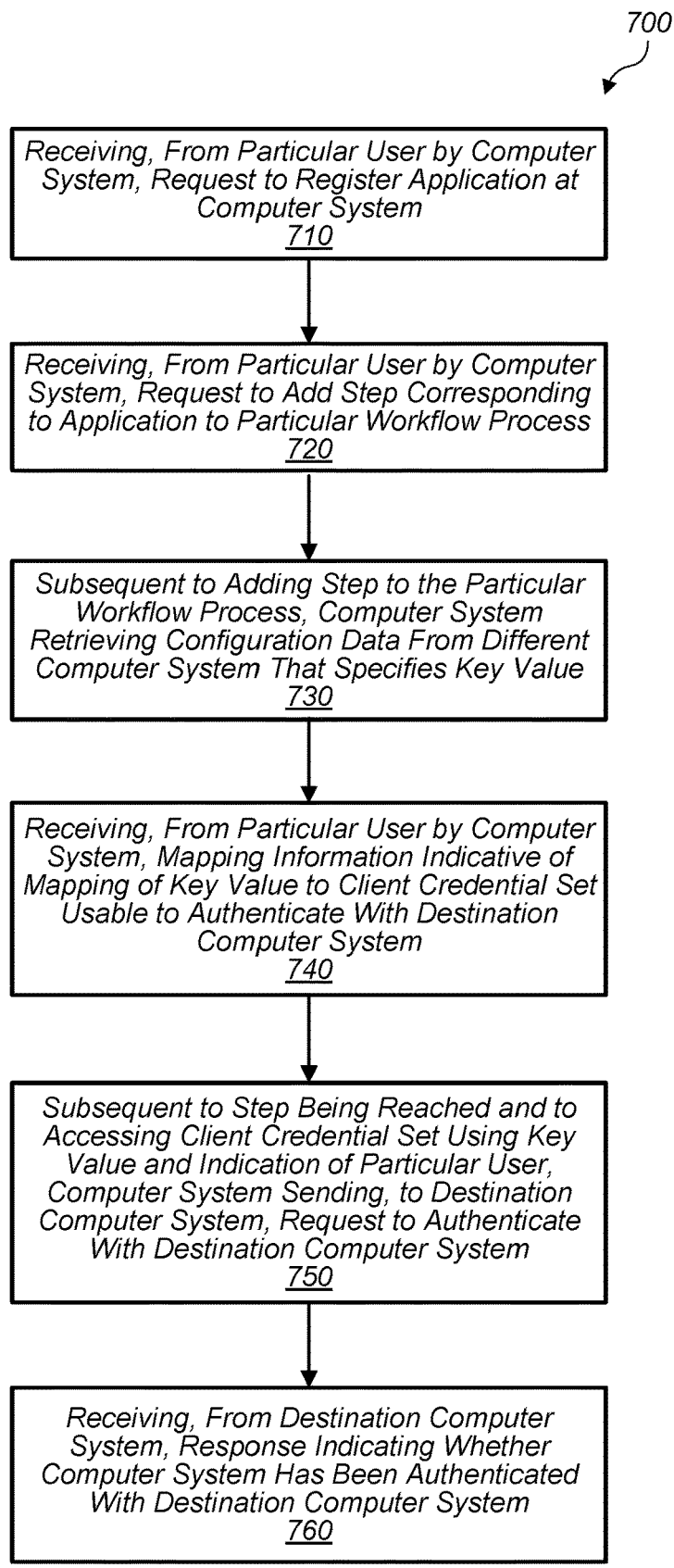

Turning now to FIG. 7, a flow diagram of a method 700 is shown. Method 700 is one embodiment of a method performed by a computer system such as computer system 110 for accessing client credential sets (e.g., client credential sets 115) to authenticate with a destination computer system (e.g., destination computer system 130). In some embodiments, method 700 includes additional steps such as the computer system providing a user access to a data store for installing an application (e.g., application 112).

Method 700 begins in step 710 with the computer system receiving, from a particular user, a request to register an application at the computer system. In various embodiments, the registration of the application may cause the application to be available for use in a workflow process (e.g., workflow process 315). In various embodiments, the execution of the application causes the computer system to send one or more requests (e.g., requests 132) to a destination computer system. In some embodiments, the computer system includes a multi-tenant database system storing data for a plurality of users in respective tenant-specific storage areas.

In step 720, the computer system receives, from the particular user, a request to add a step to a particular workflow process. This step may correspond to the registered application, and reaching the step in the particular workflow process may result in the registered application being executed.

In step 730, subsequent to adding the step to the particular workflow process, the computer system retrieves configuration data (e.g., configuration data 124) from a different computer system (e.g., peripheral computer system 120). In various embodiments, the configuration data specifies a key value (e.g., key 125). The key value may be a globally unique identifier that is specified by a developer of the application.

In step 740, the computer system receives, from the particular user, mapping information indicative of a mapping of the key value to a client credential set usable to authenticate with the destination computer system. In some embodiments, the mapping information is stored in association with an indication of the particular user—e.g., stored in or as a data object 114. The client credential set may include a client identifier and a client secret. In some embodiments, the client credential set is stored in a tenant-specific storage area corresponding to the particular user.

In step 750, subsequent to the step being reached and to accessing the client credential set using the key value and the indication of the particular user (e.g., under the particular user's account), the computer system sends, to the destination computer system, a request (e.g., request 132) to authenticate with the destination computer system. In various embodiments, the request includes the client credential set. In some embodiments, the computer system receives, from the particular user, information indicative of an address of the destination computer system. Accordingly, the request to authenticate with the destination computer system may be sent to the address.

In step 760, the computer system receives, from the destination computer system, a response (e.g., response 134) indicating whether the computer system has been authenticated with the destination computer system.

In various embodiments, the computer system receives, from a different user, a request to add, to a different workflow process, a step corresponding to the application. The computer system, in some embodiments, receives from the different user mapping information that is indicative of a mapping of the key value to a different client credential set usable to authenticate with the destination computer system. The mapping information from the different user may be stored in association with an indication of the different user. Subsequent to the step being reached in the workflow process, in various embodiments, the computer system accesses the different client credential set using the key value and the indication of the different user. The computer system, in some embodiments, sends, to the destination computer system, a request to authenticate with the destination computer system, where the request includes the different client credential set. In some embodiments, the computer system receives, form the destination computer system, a response indicating whether the computer system has been authenticated with the destination computer system.

Exemplary Multi-Tenant Database System

Figure 8:
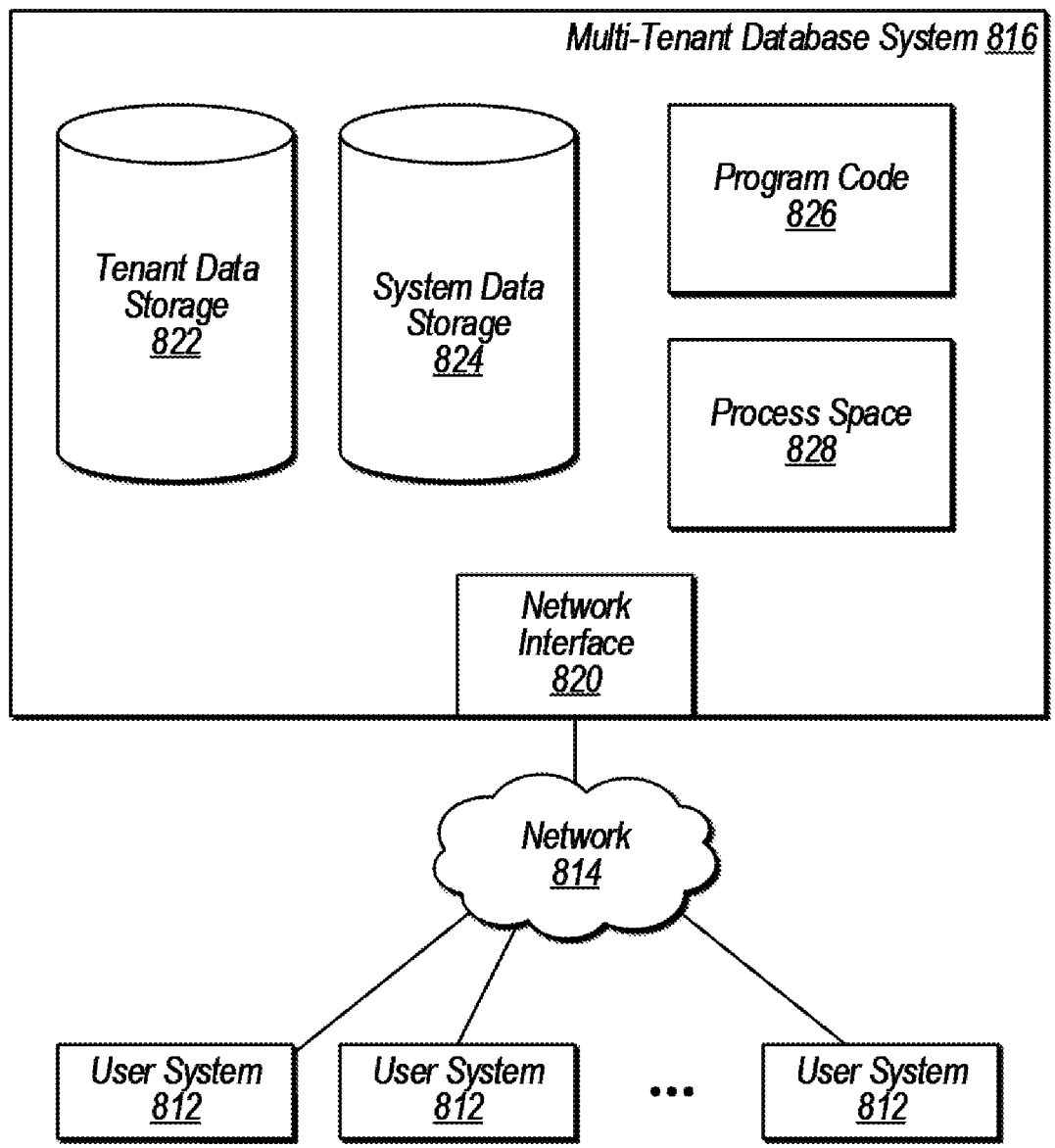
FIGS. 8-9 are block diagrams illustrating example environments for a multi-tenant database system, according to some embodiments.

FIG. 8 illustrates an exemplary environment in which a multi-tenant database and cache system might be implemented. Note that the disclosed multi-tenant systems are included to illustrative purposes but are not intended to limit the scope of the present disclosure. In other embodiments, similar techniques may be implemented in non-multi-tenant environments such as various client/server environments, cloud computing environments, clustered computers, etc. As illustrated in FIG. 8 (and in more detail in FIG. 9) one or more user systems 812 may interact via a network 814 with a multi-tenant database system (MTS) 816, which may be computer system 110. The users of those user systems 812 may be users in differing capacities and the capacity of a particular user system 812 might be determined by the current user. For example, when a salesperson is using a particular user system 812 to interact with MTS 816, that user system 812 may have the capacities allotted to that salesperson. However, while an administrator is using the same user system 812 to interact with MTS 816, it has the capacities allotted to that administrator. Accordingly, in various embodiments, information (e.g., data object 114) maintained by a system (e.g., computer system 110) implementing system 816 can be modified by only the users that have the appropriate capacities (e.g., permissions).

Network 814 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the networks that the present invention may utilize any of various other types of networks.

User systems 812 may communicate with MTS 816 using TCP/IP and, at a higher network level, use other common Internet protocols to communicate, such as HTTP, FTP, AFS, WAP, etc. As an example, where HTTP is used, user system 812 might include an HTTP client commonly referred to as a "browser" for sending and receiving HTTP messages from an HTTP server at MTS 816. Such a server might be implemented as the sole network interface between MTS 816 and network 814, but other techniques might be used as well or instead. In some implementations, the interface between MTS 816 and network 814 includes load sharing functionality, such as round-robin HTTP request distributors to balance loads and distribute incoming HTTP requests evenly over a plurality of servers. Preferably, each of the plurality of servers has access to the MTS's data, at least for the users that are accessing a server.

In some embodiments, the system shown in FIG. 8 implements a web-based customer relationship management (CRM) system. For example, in some embodiments, MTS 816 includes application servers configured to implement and execute CRM software applications as well as provide related data, code, forms, web pages and other information to and from user systems 812 and to store to, and retrieve from, a database system related data, objects and web page content. In embodiments of a multi-tenant system, tenant data is preferably arranged so that data of one tenant is kept separate from that of other tenants so that that one tenant does not have access to another tenant's data, unless such data is expressly shared.

One arrangement for elements of MTS 816 is shown in FIG. 8, including a network interface 820, storage 822 for tenant data, storage 824 for system data accessible to MTS 816 and possibly multiple tenants, program code 826 for implementing various functions of MTS 816, and a process space 828 for executing MTS system processes and tenant-specific processes, such as running applications as part of an application service.

Several elements in the system shown in FIG. 8 may include conventional, well-known elements that need not be explained in detail here. For example, each user system 812 may be a desktop personal computer, workstation, laptop, PDA, cell phone, or any WAP-enabled device or any other computing device capable of interfacing directly or indirectly to the Internet or other network connection. User system 812 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 812 to access, process, and view information and pages available to it from MTS 816 over network 814. Each user system 812 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 816 or other systems or servers. As discussed above, the present invention is suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 812 and its components are operator configurable using applications, such as a browser, that include computer code executable on one or more processing elements. Similarly, in some embodiments, MTS 816 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript.

According to one embodiment, each MTS 816 is configured to provide web pages, forms, applications, data, and/or media content to user systems 812 to support the access by user systems 812 as tenants of MTS 816. As such, in this embodiment, MTS 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline back-ups or other redundancies, etc., and might include a distributed database or storage network and associated processing intelligence.

Figure 9:
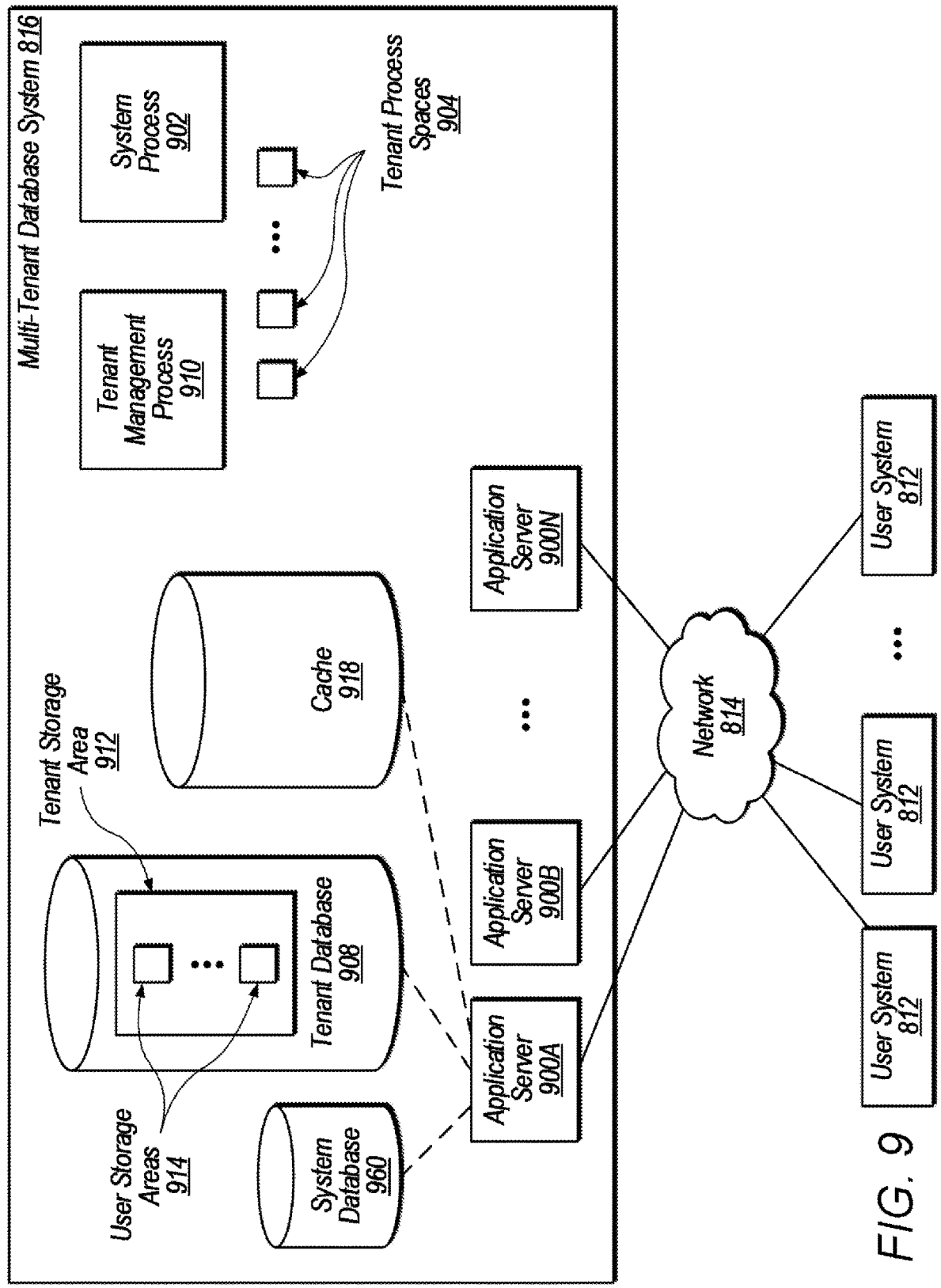

FIG. 9 illustrates exemplary embodiments of an MTS 816 and various interconnections in more detail. In this example, the network interface is implemented as one or more HTTP application servers 900. Also shown is system process space 902 including individual tenant process spaces 904, a system database 960, tenant database(s) 908 and a tenant management process space 910. Tenant database 908 may be shared across application servers 900 and may be divided into individual tenant storage areas 912, which can be either a physical arrangement or a logical arrangement. Within each tenant storage area 912, user storage 914 might be allocated for each user. While not shown, one or more applications 112 provided by tenants of MTS 816 may be running on application servers 900.

In the illustrated embodiment, each application server 900 also includes at least a portion of a cache 918. In some embodiments, user systems 812 that utilize web applications can request that data be stored in cache 918 (e.g., using a "put" operation) and later retrieve the data (e.g., using a "get" operation) rather than re-generating the data. In some embodiments, capacity limits may be assigned to different users/tenants/partitions, etc. and cached data may be evicted in order to remain below the allotted capacity. In some embodiments, cached data for a particular tenant is kept private from other tenants. Further, the visibility scope for cached data within a particular tenant may be configurable.

In some embodiments, cache 918 is split across multiple application servers 900. In some embodiments, splitting across multiple instances may allow the data in cache 918 to fit in system memory space, which may improve response times relative to storing data for cache 918 in disk storage, for example. As used herein, an "in-memory cache" is a cache that stores data in system memory space (which typically means that the data can be stored in RAM) rather than requiring paging for storage (as is typically required for traditional disc storage, for example). Cache 918 may also be a "multi-tenant" cache in the sense that a single cache is used to provide separate virtual caches for multiple different tenant entities. The different tenants may use the same data structure to store data or different tenants may have different data structures in the cache. In various embodiments, multi-tenant caches enforce data security between tenants such that data from one tenant is not available to other tenants. Thus, as used herein, the term "tenant" in the context of a multi-tenant cache refers to an entity for which cache entries are separately maintained such that different tenants cannot access each other's data. In some embodiments, tenants may authorize other tenants to access their data via the cache, while in other embodiments a given tenant's data may be accessible to only that tenant via the multi-tenant cache (although that tenant may subsequently share data retrieved from the cache, as that tenant desires).

It should also be understood that each application server 900 may be communicably coupled to database systems, e.g., system database 960 and tenant database(s) 908, via, a different network connection. For example, one server $900_1$ might be coupled via network 814, another server $900_{N-1}$ might be coupled via a direct network link, and another server $900_N$ might be coupled by yet a different network connection. Transfer Control Protocol and Internet Protocol (TCP/IP) are preferred protocols for communicating between servers 900 and the database system, however, it will be apparent to one skilled in the art that other transport protocols may be used to optimize the system depending on the network interconnect used.

In preferred aspects, each application server 900 is configured to handle requests for any user/organization. Because it is desirable to be able to add and remove application servers from the server pool at any time for any reason, there is preferably no server affinity for a user and/or organization to a specific application server 900. In one embodiment, therefore, an interface system (not shown) implementing a load balancing function (e.g., an F5 Big-IP load balancer) is communicably coupled between the servers 900 and the user systems 812 to distribute requests to the servers 900. In one aspect, the load balancer uses a least connections algorithm to route user requests to the servers 900. Other examples of load balancing algorithms, such as are round robin and observed response time, also can be used. For example, in certain aspects, three consecutive requests from the same user could hit three different servers, and three requests from different users could hit the same server. In this manner, MTS 816 is multi-tenant, wherein the MTS 816 handles storage of different objects and data across disparate users and organizations.

As an example of storage, one tenant might be a company that employs a sales force where each salesperson uses MTS 816 to manage their sales process. Thus, a user might maintain contact data, leads data customer follow-up data, performance data, goals and progress data, all applicable to that user's personal sales process (e.g., in tenant database 908). In some MTS embodiments, since all of this data and the applications to access, view, modify, report, transmit, calculate, eta, can be maintained and accessed by a user system having nothing more than network access, the user can manage his or her sales efforts and cycles from any of many different user systems. For example, if a salesperson is paying a visit to a customer and the customer has Internet access in their lobby, the salesperson can obtain critical updates as to that customer while waiting for the customer to arrive in the lobby.

While each user's sales data may be separate from other users' sales data regardless of the employers of each user, some data may be organization-wide data shared or accessible by a plurality or all of the sales three for a given organization that is a tenant. Thus, there may be some data structures managed by MTS 816 that are allocated at the tenant level while other data structures are managed at the user level. Because an MTS may support multiple tenants including possible competitors, the MTS should have security protocols that keep data, applications and application use separate. Also, because many tenants will opt for access to an MTS rather than maintain their own system, security, redundancy, up-time and backup are more critical functions and need to be implemented in the MTS.

In addition to user-specific data and tenant-specific data, MTS 816 might also maintain system level data usable by multiple tenants. Such system level data might include industry reports, news, postings, and the like that are sharable among tenants.

In certain aspects, client systems 812 communicate with application servers 900 to request and update system-level and tenant-level data from MTS 816 that may require one or more queries to database 960 and/or database 908. Accordingly, servers 900 may run applications 112 supplied by a provider of MTS 816 to perform one or more particular operations. In some embodiments, MTS 816 automatically generates one or more SQL statements (the SQL query) designed to access the desired information.

Each database may generally be viewed as a set of logical tables containing data fitted into predefined categories. Each table typically contains one or more data categories logically arranged in physical columns. Each row of a table typically contains an instance of data for each category defined by the columns. For example, a CRM database may include a table that describes a customer with columns for basic contact information such as name, address, phone number, fax number, etc. Another table may describe a purchase order, including columns for information such as customer, product, sale price, date, etc.

Figure 10:
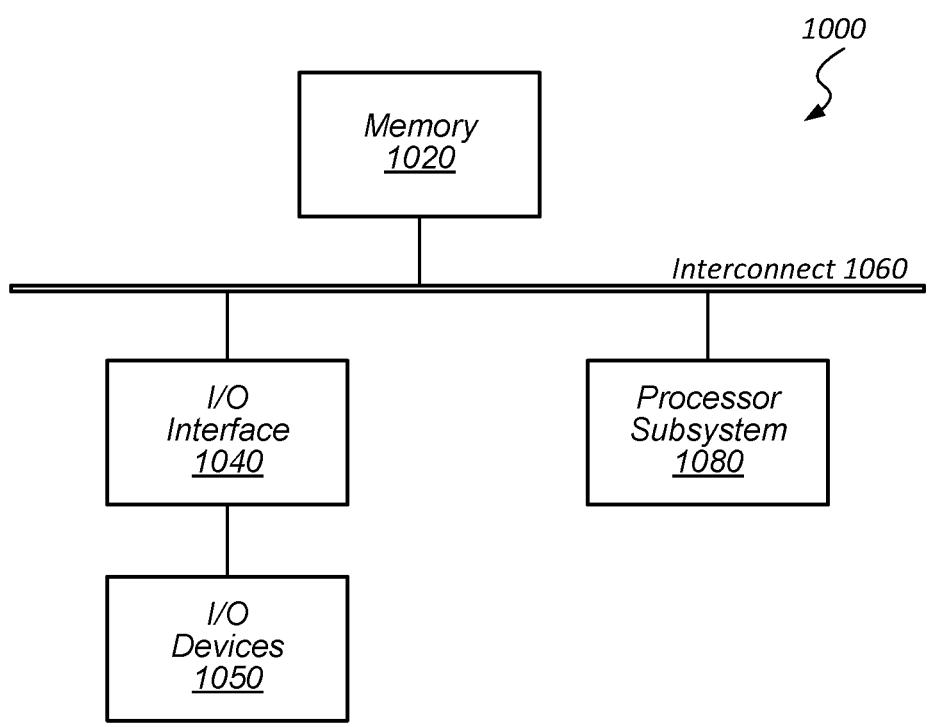
FIG. 10 is a block diagram illustrating an example computer system, according to some embodiments.

Turning now to FIG. 10, a block diagram of an exemplary computer system 1000, which may implement computer system 110, peripheral computer system 120, and/or destination computer system 130, is depicted. Computer system 1000 includes a processor subsystem 1080 that is coupled to a system memory 1020 and I/O interfaces(s) 1040 via an interconnect 1060 (e.g., a system bus). I/O interface(s) 1040 is coupled to one or more I/O devices 1050. Computer system 1000 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1000 is shown in FIG. 10 for convenience, system 1000 may also be implemented as two or more computer systems operating together.

Processor subsystem 1080 may include one or more processors or processing units. In various embodiments of computer system 1000, multiple instances of processor subsystem 1080 may be coupled to interconnect 1060. In various embodiments, processor subsystem 1080 (or each processor unit within 1080) may contain a cache or other form of on-board memory.

System memory 1020 is usable store program instructions executable by processor subsystem 1080 to cause system 1000 perform various operations described herein. System memory 1020 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1000 is not limited to primary storage such as memory 1020. Rather, computer system 1000 may also include other forms of storage such as cache memory in processor subsystem 1080 and secondary storage on I/O Devices 1050 (e.g., a hard drive, storage array, etc.). In some embodiments, these other forms of storage may also store program instructions executable by processor subsystem 1080. Applications 112 described above may be included within system memory 1020.

I/O interfaces 1040 may be any of various types of interfaces configured to couple to and communicate with other devices, according to various embodiments. In one embodiment, I/O interface 1040 is a bridge chip (e.g., Southbridge) from a front-side to one or more back-side buses. I/O interfaces 1040 may be coupled to one or more I/O devices 1050 via one or more corresponding buses or other interfaces. Examples of I/O devices 1050 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1050 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
providing, by a computer system, a server-based platform accessible to a plurality of users, wherein the server-based platform permits an application that is developed by one of the plurality of users to be utilized by others of the plurality of users;
subsequent to receiving an indication to make available an application for a particular one of the plurality of users, the computer system retrieving configuration data from a different computer system, wherein the configuration data specifies a reference to a key value;
maintaining, by the computer system, a data object that includes a client credential set for the particular user;
in response to an occurrence of an event associated with the application, the computer system:
 accessing the client credential set of the particular user from the data object, wherein the client credential set of the particular user is accessed using the key value and an indication of the particular user;
 sending, to a destination computer system, a request to authenticate with the destination computer system, wherein the request includes the client credential set; and
 receiving, from the destination computer system, a response that indicates whether the computer system has been authenticated with the destination computer system.

2. The method of claim 1, further comprising:
receiving, by the computer system, an indication to make available the application for a different one of the plurality of users;
maintaining, by the computer system, a second data object that includes a client credential set for the different user;
in response to an occurrence of an event associated with the application and the different user, the computer system:
 accessing the client credential set of the different user from the second data object, wherein the client credential set of the different user is accessed using the key value and an indication of the different user; and
 sending, to a different destination computer system, a request to authenticate with the different destination computer system, wherein the request includes the client credential set of the different user.

3. The method of claim 1, further comprising:
prior to sending the request to authenticate with the destination computer system, the computer system receiving, from the particular user, information defining a mapping from the key value to the client credential set.

4. The method of claim 1, wherein the indication of the particular user corresponds to an account under which the data object is maintained, and wherein accessing the client credential set includes accessing the data object for the account.

5. The method of claim 1, wherein making the application available includes installing the application under an account of the particular user and allowing the particular user to add a step corresponding to the application to a workflow process.

6. The method of claim 5, wherein the occurrence of the event includes reaching the step in the workflow process.

7. The method of claim 1, further comprising:
prior to sending the request to authenticate with the destination computer system, the computer system receiving, from the particular user, information specifying a uniform resource locator (URL) that corresponds to the destination computer system, wherein the request to authenticate is sent based on the specified URL.

8. A non-transitory computer-readable medium having program instructions stored thereon that are capable of causing a computer system to perform operations comprising:
providing a server-based platform accessible to a plurality of users, wherein the server-based platform permits an application that is developed by one of the plurality of users to be installed by others of the plurality of users;
receiving, from a particular user, a request to install the application in association with an account of the particular user at the server-based platform;
subsequent to installing the application for the particular user, retrieving configuration data that specifies a reference to a key value;
maintaining a data object in association with the account of the particular user, wherein the data object includes a client credential set for the particular user; and
in response to an occurrence of an event associated with the application:
  accessing the client credential set of the particular user from the data object, wherein the client credential set of the particular user is accessed using the key value and an indication of the particular user;
  sending, to a destination computer system, a request to authenticate with the destination computer system, wherein the request includes the client credential set; and
  receiving, from the destination computer system, a response that indicates whether the computer system has been authenticated with the destination computer system.

9. The non-transitory computer-readable medium of claim 8, wherein the operations further comprise:
receiving, from a different user, a request to install the application in association with an account of the different user at the server-based platform;
maintaining a second data object in association with the account of the different user, wherein the data object includes a client credential set for the different user; and
in response to an occurrence of an event associated with the application:
  accessing the client credential set of the different user from the second data object, wherein the client credential set of the different user is accessed using the key value and an indication of the different user; and
  sending, to the destination computer system, a request to authenticate with the destination computer system, wherein the request includes the client credential set of the different user.

10. The non-transitory computer-readable medium of claim 8, wherein the operations further comprise:
subsequent to installing the application for the particular user, receiving a request from the particular user to modify a workflow process to add a step corresponding to the application; and
in response to receiving a request to configure the added step, performing the retrieving of the configuration data.

11. The non-transitory computer-readable medium of claim 8, wherein the operations further comprise:
receiving, from the particular user, authentication information that specifies a uniform resource locator (URL), the client credential set, and a mapping between the key value and the client credential set, wherein the URL corresponds to an authentication service implemented at the destination computer system, and the data object corresponds to the mapping.

12. The non-transitory computer-readable medium of claim 8, wherein the response from the destination computer system includes an authentication token, and wherein the operations further comprise:
making authenticated application programming interface (API) calls to the destination computer system on behalf of the application, wherein the API calls include the authentication token.

13. The non-transitory computer-readable medium of claim 8, wherein in response to the occurrence of the event associated with the application, executing the installed application to perform a set of operations that initiate the accessing, the sending, and the receiving.

14. The non-transitory computer-readable medium of claim 8, wherein the indication of the particular user is an account identifier corresponding to the account under which the data object is maintained.

15. A method, comprising:
receiving, from a particular user by a computer system, a request to register an application at the computer system, wherein registration of the application causes the application to be available for use in a workflow process, and wherein execution of the application causes the computer system to send one or more requests to a destination computer system;
receiving, from the particular user by the computer system, a request to add a step to a particular workflow process, wherein the step corresponds to the registered application, and wherein reaching the step within the particular workflow process results in the registered application being executed;
subsequent to adding the step to the particular workflow process, the computer system retrieving configuration data from a different computer system, wherein the configuration data specifies a key value;
receiving, from the particular user by the computer system, mapping information indicative of a mapping of the key value to a client credential set usable to authenticate with the destination computer system, wherein the mapping information is stored in association with an indication of the particular user; and subsequent to the step being reached and to accessing the client credential set using the key value and the indication of the particular user, the computer system:

sending, to the destination computer system, a request to authenticate with the destination computer system, wherein the request includes the client credential set; and receiving, from the destination computer system, a response indicating whether the computer system has been authenticated with the destination computer system.

16. The method of claim 15, further comprising:

receiving, from a different user by the computer system, a request to add, to a different workflow process, a step corresponding to the application;

receiving, from the different user by the computer system, mapping information that is indicative of a mapping of the key value to a different client credential set usable to authenticate with the destination computer system, wherein the mapping information from the different user is stored in association with an indication of the different user; and subsequent to the step added to the different workflow process being reached, the computer system:

accessing the different client credential set using the key value and the indication of the different user;

sending, to the destination computer system, a request to authenticate with the destination computer system, wherein the request includes the different client credential set; and receiving, form the destination computer system, a response indicating whether the computer system has been authenticated with the destination computer system.

17. The method of claim 15, further comprising:

receiving, from the particular user by the computer system, information indicative of an address of the destination computer system, wherein the request to authenticate with the destination computer system is sent to the address.

18. The method of claim 15, wherein the client credential set includes a client identifier and a client secret.

19. The method of claim 15, wherein the key value is a globally unique identifier specified by a developer of the application.

20. The method of claim 15, wherein the computer system includes a multi-tenant database system storing data for a plurality of users in respective tenant-specific storage areas, wherein the client credential set is stored in a tenant-specific storage area corresponding to the particular user.

* * * * *